United States Patent [19]

Vanderminden

[11] 4,264,230
[45] Apr. 28, 1981

[54] JOINT FOR OUTDOOR FURNITURE

[75] Inventor: Robert D. Vanderminden, Granville, N.Y.

[73] Assignee: The Telescope Folding Furniture Co., Inc., Granville, N.Y.

[21] Appl. No.: 854,197

[22] Filed: Nov. 23, 1977

[51] Int. Cl.³ .......................... F16B 9/02; F16D 1/06
[52] U.S. Cl. ................................ 403/180; 403/182; 403/234; 403/259; 403/261
[58] Field of Search ............... 403/167, 168, 234, 180, 403/182, 183, 241, 171, 176, 264, 258, 259, 260, 231, 109, 284; 297/440; 248/188, 91; 108/153

[56] References Cited

U.S. PATENT DOCUMENTS

| 214,545 | 4/1879 | Bacon | 285/399 |
|---|---|---|---|
| 1,558,268 | 10/1925 | Mast | 403/184 |
| 2,190,555 | 2/1940 | Toce et al. | 403/259 |
| 2,346,448 | 4/1944 | Noblitt et al. | 108/153 X |
| 2,557,766 | 6/1951 | Ronfeldt | 108/153 UX |
| 3,170,418 | 2/1965 | Gruenstein | 403/261 X |
| 3,471,182 | 10/1969 | Schroer | 403/231 |
| 3,891,334 | 6/1975 | Loikitz | 403/234 |

FOREIGN PATENT DOCUMENTS 448527  10/1936  United Kingdom .................... 403/234

*Primary Examiner*—James Kee Chi
*Attorney, Agent, or Firm*—Kenyon & Kenyon

[57] ABSTRACT

The joint is formed between two mutually perpendicular tubes by seating a washer in one tube, a nut within the other tube and by passing a bolt through the washer into threaded engagement with the nut. The resulting joint is hidden from view. A spreader bar is formed by joining the ends of two tubular sections within each other after each section is joined to a tube.

11 Claims, 5 Drawing Figures

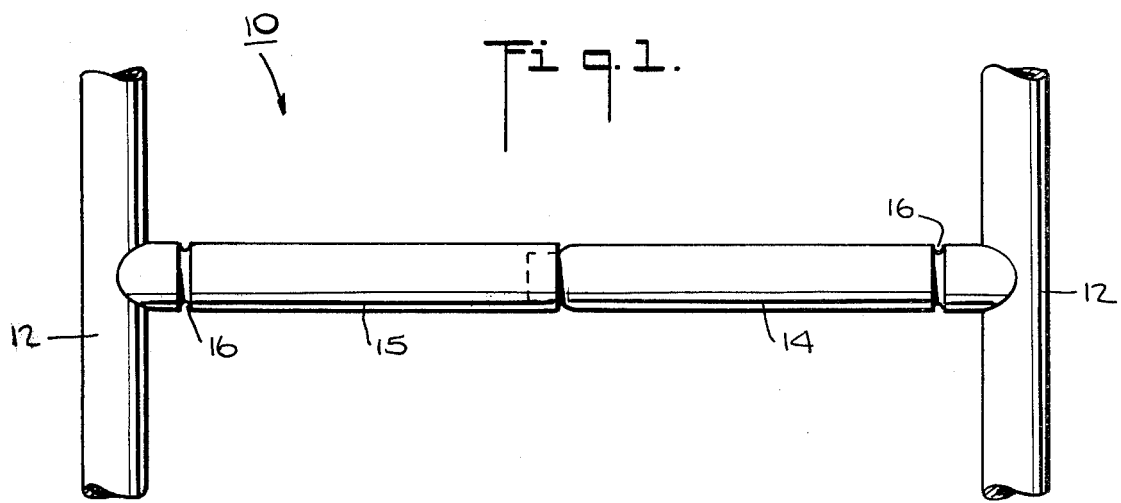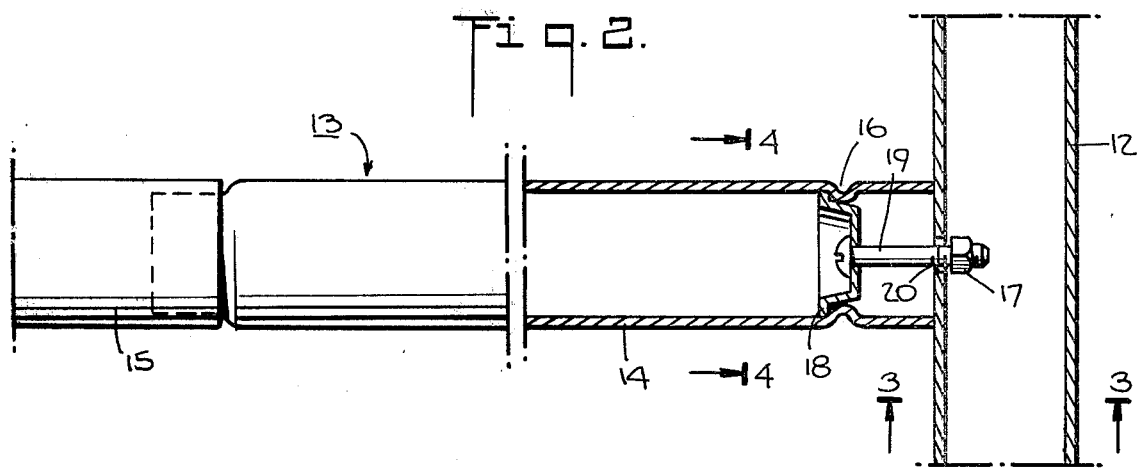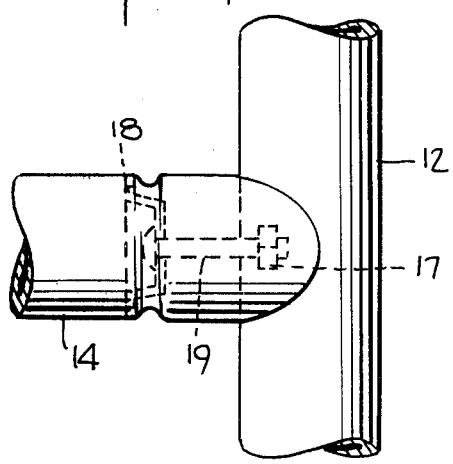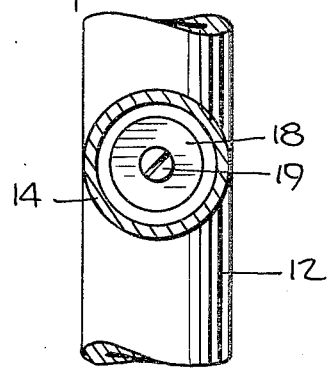

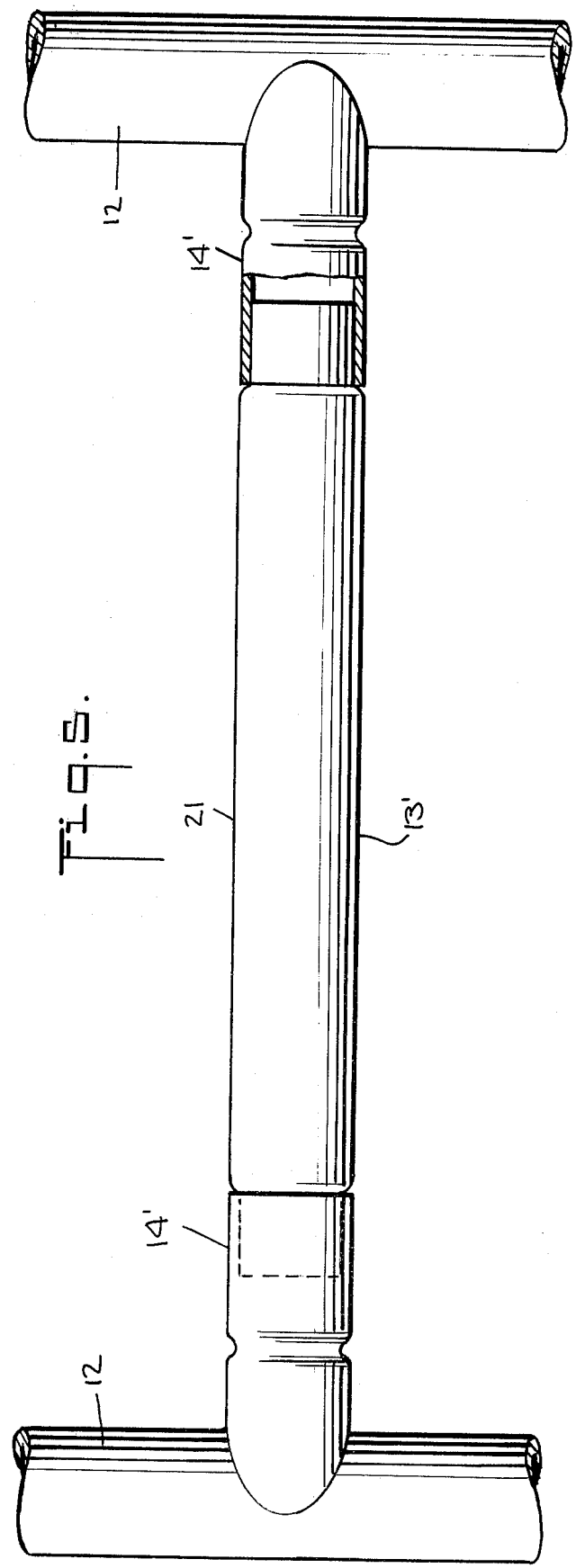

JOINT FOR OUTDOOR FURNITURE

This invention relates to a joint for outdoor furniture. More partucularly, this invention relates to a hidden joint for securing two tubes of a furniture frame together.

Heretofore, it has been known that various types of furniture require the joining together of tubular elements in order to create a frame, for example for use in making a chair, chaise and the like. In many instances, the joints which have been formed between the tubular members have used steel nut and bolt or rivet-type connections which have exposed parts. As a result, when used on outdoor furniture, the exposed parts of the joint are frequently found to corrode under the effects of rain and/or ocean spray. For example, where the furniture is located near salt water, the steel bolts frequently rust and cause red rust to run down the furniture legs causing an unsightly stain. In order to avoid this, the bolts have been made of aluminum alloy. However, it has been found that these aluminum bolts are not as strong as steel bolts. Further, once the power-coating or paint usually found on these parts has worked off, the aluminum bolts may oxidize and show black marks down the coated or painted legs of the futniture.

Accordingly, it is an object of the invention to provide a hidden joint for use on tubular furniture.

It is another object of the invention to provide a joint for tubular futniture which eliminates the use of exposed parts which may corrode.

It is another object of the invention to provide a furniture frame of pleasing appearance.

Briefly, the invention provides a joint for outdoor furniture which comprises at least a pair of tubes which are butted together in angular relation and a means for joining the tubes together from within in interlocking engagement. This means includes a nut disposed within one tube in alignment with a hole in the periphery of the tube, a washer seated within the other tube and a bolt which passes through the washer and the nut in interlocking engagement in order to secure the tubes together. In order to hold the washer in place, a ring is rolled into the tube so that the washer can abut against the ring.

The bolt can be secured to the nut in any suitable fashion as by threading and any suitable nut such as a weld nut, regular hex nut or a rivnut can be used. Also, the nut can be fixedly mounted within the hole-containing tube.

The joint is generally constructed with tubes which are in the form of hollow cylinders. In this case, one tube is provided with a notched end so as to fit about the other tube.

In order to form a furniture frame comprised of a pair of hollow legs and a spreader bar which is disposed between the legs, the spreader bar is made of a pair of telescoped tubes and each tube is secured to a leg in the above manner. That is, a washer is seated in each tube, a nut is disposed within a respective leg and a bolt is passed through the washer and nut in interlocking engagement in order to secure the tube to the leg.

These and other objects and advantages of the invention will become more apparent from the following detailed description and appended claims taken in conjunction with the accompanying drawings in which:

FIG. 1 illustrates a view of a furniture frame utilizing a joint made in accordance with the invention;

FIG. 2 illustrates a view of a joint made in accordance with the invention;

FIG. 3 illustrates a view taken on line 3—3 of FIG. 2;

FIG. 4 illustrates a view taken on line 4—4 of FIG. 2, and

FIG. 5 illustrates a view of a modified spreader bar according to the invention.

Referring to FIG. 1, the furniture frame 10 is formed of a pair of vertically disposed legs 12 each of which is made of a hollow cylindrical tube and a spreader bar 13 which is disposed horizontally between the legs 12 in perpendicular relation to the legs 12. As shown, the spreader bar 13 is formed of a pair of telescoped tubes 14, 15 which are joined together in a friction fit manner. For example, one tube 14 has a swaged end which fits into the open end of the other tube 15. The spreader bar is secured to the legs 12 at each end in an interlocked joint.

Referring to FIGS. 2 to 4, the joint which is formed by a hollow cylindrical tube 12 and a tube 14 also includes a means for securing the tubes 12, 14 together. To this end, the tube 14 is provided with a radius cut in the end abutted to a leg 12 in order to abut the leg 12 in a smooth substantially seal-tight manner. The tube 14 is also provided with an annular ring or groove 16 which is rolled into the tube 14 near the end to deform a portion of the inside of the tube 14 in a corresponding manner.

The means for securing the tubes 12, 14 together employs a nut 17, a washer 18 and a bolt 19. The nut 17 is disposed within the tube 12 in alignment with a hole 20 in the periphery of the tube 12; the washer 18 is abutted and seated against the ring 16; and the bolt 19 passes through the washer 18 into threaded engagement with the nut 17 to form an interlocking engagement of the tubes 12, 14.

The hole 20 in the tube 12 can be formed in any suitable manner such as by drilling or punching. In any case, the hole 20 is sized to accommodate the bolt 19. Also, the nut 17 which is positioned inside the tube 12 can be held in place with a special tool (not shown) for assembly purposes or can be suitably fixed in place within the tube 12. The washer 18 may be in the form of a cup washer with a diameter slightly smaller than the inside diameter of the tube 14 but greater than the ring 16.

The joint at the opposite end of the spreader bar 13 is formed in the same manner as above and need not be further described.

Referring to FIG. 1, in order to assemble the furniture frame 10, the tube 14 is disposed in alignment with the hole 20 in the leg 12. Next, the nut 17 is positioned inside the tube 12 through an open end and aligned with the hole 20. The nut 17 is then held in place with a special tool (not shown). The washer 18 and bolt 19 are then placed within the tube 14 and a long tool inserted into the open end of the tube 14 onto the bolt 19; the threaded end of the bolt 19 into the nut 17. The joint for the other leg of the furniture frame is formed in the same manner. Next, the swaged end of the tube 14 is inserted into the open end of the tube 15 to complete the unit.

Referring to FIG. 5, the spreader bar 13' may also be made of a three-piece construction. Such a spreader bar 13' has, for example, a pair of end tubes 14' similar to tubes 14 above for forming respective joints with a leg 12 and a central straight tube 21 which can vary in length. As shown, the central tube 21 is swaged at opposite ends to fit into the end tubes 14'. This construction allows a longer spreader bar to be fabricated such as for a love seat or a setee.

The invention thus provides a simple means of joining the tubular element of a furniture frame together. Further, the invention provides a joint in which the connecting parts are hidden within the connected parts.

The invention further provides a joint which can be used for furniture frames employing tubular elements of cylindrical or other cross sectional shape.

What is claimed is:

1. A joint for outdoor furniture comprising
   a first elongated tube having a hole in a periphery thereof;
   a second elongated tube abutted at one end thereof to said first tube in alignment with said hole in said first tube and having a groove rolled therein to deform a portion of the inside of said second tube;
   a washer within said second tube and abutted and seated against said deformed portion in said second tube;
   a nut disposed within said first tube in alignment with said hole thereof; and
   a bolt passing through said washer in said second tube and said nut in said first tube in interlocking engagement with said nut to secure said tubes together.

2. A joint as set forth in claim 1 wherein said first and second tubes are made of aluminum and said bolt is made of steel.

3. A joint as set forth in claim 1 wherein said bolt is threaded into said nut.

4. A joint as set forth in claim 1 wherein said nut is fixedly mounted in said first tube.

5. A joint as set forth in claim 1 wherein said tubes are disposed in perpendicular relation to each other.

6. A joint as set forth in claim 1 wherein said tubes are hollow cylinders.

7. A joint as set forth in claim 1 wherein said second tube has a notched end fitted to said first tube.

8. A furniture frame comprising a pair of hollow legs;
   a spreader bar disposed between said legs, said bar having a pair of telescoped tube sections, each respective tube section having a ring rolled therein; and
   means securing each tube section to a respective leg, each said means including a washer within, and abutted and seated against a respective ring in a respective tube section, a nut disposed within a respective leg, and a bolt passing through said washer and said nut in interlocking engagement with said nut to secure said tube section to said leg.

9. A furniture frame as set forth in claim 8 wherein said legs and said tube sections are cylindrical.

10. A furniture frame comprising;
    a first tube having a hole in a periphery thereof;
    a second tube having a radius cut in one end abutted to said first tube in alignment with said hole and having an annular ring near said one end;
    a first cup washer within said second tube abutted and seated against said annular ring;
    a first bolt within said second tube passing through said cup washer and said hole in said first tube;
    a first nut within said first tube fastened to said first bolt;
    a third tube having a hole in a periphery thereof;
    a fourth tube having a radius cut in one end abutted to said third tube in alignment with said hole in said third tube, an annular ring near said one end, and a swaged opposite end fitted into an end of said second tube;
    a second cup washer within said fourth tube abutted and seated against said annular ring in said fourth tube;
    a second bolt within said fourth tube passing through said second cup washer and said hole in said third tube; and
    a second nut within said third tube fastened to said second bolt.

11. A joint for outdoor furniture comprising
    a pair of tubes butted together in angular relation and one of which has a groove rolled therein to deform a portion of the inside thereof, and
    means joining said tubes together from within in interlocking engagement said means including a nut disposed within one tube, a washer within, abutted and seated against said deformed portion in the other of said tubes and a bolt passing through said washer and said nut in interlocking engagement with said nut.

* * * * *

UNITED STATES PATENT AND TRADEMARK OFFICE
CERTIFICATE OF CORRECTION

PATENT NO. : 4,264,230

DATED : April 28, 1981

INVENTOR(S) : ROBERT D. VANDERMINDEN

It is certified that error appears in the above—identified patent and that said Letters Patent is hereby corrected as shown below:

Column 1, line 23, change "power" to --powder--

Signed and Sealed this

Fourth Day of August 1981

[SEAL]

Attest:

GERALD J. MOSSINGHOFF

Attesting Officer     Commissioner of Patents and Trademarks